(12) United States Patent
Nozaki et al.

(10) Patent No.: US 11,052,440 B2
(45) Date of Patent: Jul. 6, 2021

(54) OUTER LAYER OF ROLLING ROLL AND COMPOSITE ROLL FOR ROLLING

(71) Applicant: HITACHI METALS, LTD., Tokyo (JP)

(72) Inventors: Yasunori Nozaki, Kitakyusyu (JP); Nozomu Oda, Kitakyusyu (JP); Shiho Fukumoto, Yasugi (JP)

(73) Assignee: HITACHI METALS, LTD., Tokyo (JP)

( * ) Notice: Subject to any disclaimer, the term of this patent is extended or adjusted under 35 U.S.C. 154(b) by 511 days.

(21) Appl. No.: 16/089,204

(22) PCT Filed: Mar. 28, 2017

(86) PCT No.: PCT/JP2017/012682
§ 371 (c)(1),
(2) Date: Sep. 27, 2018

(87) PCT Pub. No.: WO2017/170570
PCT Pub. Date: Oct. 5, 2017

(65) Prior Publication Data
US 2020/0298294 A1   Sep. 24, 2020

(30) Foreign Application Priority Data

Mar. 31, 2016 (JP) .............. JP2016-073228

(51) Int. Cl.
| | |
|---|---|
| *B21B 27/02* | (2006.01) |
| *C22C 38/48* | (2006.01) |
| *C22C 38/54* | (2006.01) |
| *C22C 38/44* | (2006.01) |
| *C22C 38/56* | (2006.01) |
| *C22C 38/46* | (2006.01) |
| *C22C 38/58* | (2006.01) |

(Continued)

(52) U.S. Cl.
CPC ............. *B21B 27/02* (2013.01); *B32B 1/08* (2013.01); *B32B 15/011* (2013.01); *C22C 38/44* (2013.01);
(Continued)

(58) Field of Classification Search
None
See application file for complete search history.

(56) References Cited

U.S. PATENT DOCUMENTS

| | | | |
|---|---|---|---|
| 4,546,527 A | 10/1985 | Fukuda et al. | |
| 5,225,007 A * | 7/1993 | Hattori | F16C 13/00 148/541 |

(Continued)

FOREIGN PATENT DOCUMENTS

| | | |
|---|---|---|
| JP | 8-20837 A | 1/1996 |
| JP | 2002-47529 A | 2/2002 |

(Continued)

OTHER PUBLICATIONS

International Search Report for PCT/JP2017/012682 dated May 16, 2017 (PCT/ISA/210).

(Continued)

*Primary Examiner* — David Sample
*Assistant Examiner* — Elizabeth Collister
(74) *Attorney, Agent, or Firm* — Sughrue Mion, PLLC

(57) ABSTRACT

An outer layer of a rolling roll having a chemical composition comprising by mass 1.3-2.8% of C, 0.3-1.8% of Si, 0.3-2.5% of Mn, 0-6.5% of Ni, 1-10% of Cr, 0.9-6% of Mo, 0-8% of W, 0.5-6% of V, 0-3% of Nb, and 0% or more and less than 0.01% of B, the balance being Fe and inevitable impurities, and meeting the formulae (1): 1000≤1177−52C+14Si−11Mn+6.8Cr+1W+0.65Mo+12V+15Nb≤1115, and (2): 5≤Cr+Mo+0.5W+V+1.2Nb≤15, wherein C, Si, Mn, Cr, W, Mo, V and Nb represent % by mass of these elements, and a structure containing eutectic carbide without graphite.

6 Claims, 4 Drawing Sheets

(51) Int. Cl.
  *B32B 1/08* (2006.01)
  *B32B 15/01* (2006.01)
  *C22C 37/00* (2006.01)
  *B22D 19/16* (2006.01)
  *B22D 13/00* (2006.01)
  *B21B 27/00* (2006.01)

(52) U.S. Cl.
  CPC .............. *C22C 38/46* (2013.01); *C22C 38/48* (2013.01); *C22C 38/54* (2013.01); *C22C 38/56* (2013.01); *C22C 38/58* (2013.01); *B21B 27/005* (2013.01); *B22D 13/00* (2013.01); *B22D 19/16* (2013.01); *C22C 37/00* (2013.01)

(56) References Cited

U.S. PATENT DOCUMENTS 5,316,596 A * 5/1994 Kataoka .................. B21B 27/00
                                              148/321
9,358,758 B2    6/2016 Oda et al.
9,718,106 B2    8/2017 Hattori et al.
9,724,740 B2    8/2017 Oda et al.
2015/0336353 A1   11/2015 Oda et al.
2016/0193637 A1   7/2016 Oda et al.
2016/0193638 A1   7/2016 Hattori et al.
2017/0225209 A1   8/2017 Tsujimoto et al.

FOREIGN PATENT DOCUMENTS

| JP | 2005-169426 A | 6/2005 |
| JP | 2017/012682 A1 | 5/2017 |
| WO | 2014/178437 A1 | 11/2014 |
| WO | 2015/045720 A1 | 4/2015 |
| WO | 2015/045984 A1 | 4/2015 |

OTHER PUBLICATIONS

Extended European Search Report dated Oct. 23, 2019 issued by the European Patent Office in counterpart application No. 17775107.0.

* cited by examiner

Temperature (°C)

OUTER LAYER OF ROLLING ROLL AND COMPOSITE ROLL FOR ROLLING

CROSS REFERENCE TO RELATED APPLICATIONS

This application is a National Stage of International Application No. PCT/JP2017/012682 filed Mar. 28, 2017, claiming priority based on Japanese Patent Application No. 2016-073228, filed Mar. 31, 2016.

FIELD OF THE INVENTION

The present invention relates to an outer layer of a rolling roll having excellent wear resistance, sticking resistance and surface-roughening resistance, which is suitable for use in finishing rear stands for hot-strip rolling prone to suffer sticking, stands for differential-speed rolling for a section mill, etc., and a rolling roll having a composite structure comprising such outer layer integrally fused to a tough inner layer.

BACKGROUND OF THE INVENTION

A heated slab as thick as several hundreds of millimeters, which is produced by continuous casting, etc., is rolled to a steel strip as thick as several to several tens of millimeters by a hot strip mill comprising a roughing mill and a finishing mill. The finishing mill usually comprises 5 to 7 four-high stands arranged in tandem. In the case of a seven-stand finishing mill, first to third stands are called "front stands," and fourth to seventh stands are called "rear stands." A working roll used in such a hot strip mill comprises an outer layer coming into contact with a hot strip, and an inner layer integrally fused to an inner surface of the outer layer.

Recent demand of increasingly higher thickness precision and surface quality of hot-rolled steel strips requires rolling rolls having higher wear resistance, so that high speed steel rolls have become used in front stands of a hot-rolling finishing mill for producing thin steel strips. However, high-alloy grain cast iron rolls are conventionally used mainly in rear stands of a hot-rolling finishing mill, which likely suffers so-called "cobble," in which steel strips folded while moving through the stands are rolled in an overlapped state by upper and lower rolls.

Because a strip being rolled is stuck to outer layer surfaces of rolls in such overlapped rolling, the roll outer layer receives an excessive thermal, mechanical load, so that cracking likely occurs on the surface. If the cracked roll continues to be used, cracks would propagate, likely causing damage such as breakage and spalling to the roll. When a strip-folding or sudden mill stoppage occurs, the roll surface should be cut to remove cracks, so that the roll would suffer large loss if deep cracks were formed, resulting in an increased roll cost. It is thus desired to provide an outer layer of a rolling roll having such excellent impact resistance as to suffer less damage by cracking even when rolling failure occurs, and a rolling composite roll comprising such outer layer.

Because indefinite chilled iron rolls having a structure comprising graphite, carbide and a matrix have particularly excellent sticking resistance, they are extremely resistant to cracking and its propagation even when cobble occurs. Thus, the indefinite chilled iron rolls have excellent impact resistance. However, because the constituting carbide is $M_3C$ (cementite), indefinite chilled iron has poorer wear resistance than that of high-speed steel. Accordingly, various improvements have been attempted. For example, as a technology for improving the wear resistance of a composite roll comprising an outer layer of indefinite chilled iron, the applicant previously found that by adding Mg or Ca to the outer layer, fine MC carbide particles can be uniformly dispersed in the metal structure, proposing by JP 2005-169426 A a rolling composite roll having improved wear resistance, surface-roughening resistance and impact resistance. However, because this composite roll contains graphite in the outer layer, it is poorer in wear resistance and surface-roughening resistance than usual high-speed steel rolls, despite excellent sticking resistance.

As a composite roll comprising an outer layer of high-speed steel having high wear resistance for hot-rolling, finishing front stands, for example, JP 08-020837 A discloses an outer layer of a rolling roll having a small friction coefficient, the outer layer being made of high-speed steel comprising by weight 1.50-3.50% of C, 1.50% or less of Si, 1.20% or less of Mn, 5.50-12.00% of Cr, 2.00-8.00% of Mo, 3.00-10.00% of V, 0.60-7.00% of Nb, more than 0.01% and 0.200% or less of B, and more than 0.08% and 0.300% or less of N, and meeting $V+1.8Nb \leq 7.5C-6.0$, and $0.20 \leq Nb/V \leq 0.80$, the balance being Fe and inevitable impurities. JP 08-020837 A describes that by increasing eutectic carbide in the structure of a roll outer layer, steps between carbide particles and other portions can be reduced, thereby lowering the friction coefficient of the outer layer. The addition of B and N lowers a friction coefficient on a contact surface of the roll. However, further improvement is required in the sticking resistance of an outer layer of a composite roll for rolling.

JP 2002-47529 A discloses an outer layer of a hot-rolling roll having a composition comprising by mass 1.2-2.2% of C, 0.1-0.6% of Si, 0.1-0.6% of Mn, 6-12% of Cr, 3-6% of Mo, 0.3-1.5% of Ni, 3-8% of V, and Co: 1.0-8.00%, and meeting $0 \leq [C-0.236V-0.129Nb] \leq 0.4$, and $0.27 \leq Mo/Cr \leq 0.80$, the balance being Fe and inevitable impurities. JP 2002-47529 A describes that to prevent the propagation of cracking when cobble occurs, the formation of net-shaped eutectic carbide is suppressed in the roll outer layer to reduce the propagation paths of cracking, thereby obtaining a hot-rolling roll outer layer having excellent impact resistance. However, the outer layer of JP 2002-47529 A does not have sufficient wear resistance and sticking resistance.

WO 2016/031519 A1 discloses an outer layer of a composite roll for rolling, which comprises by mass 1.8-2.5% of C, more than 0% and 1.0% or less of Si, more than 0% and 1.0% or less of Mn, more than 0% and 0.5% or less of Ni, more than 3.0% and 8.0% or less of Cr, more than 2.0% and 10.0% or less of Mo, more than 0% and 10.0% or less of W, more than 0% and 10.0% or less of V, and more than 0% and less than 0.01% of B, the balance being Fe and inevitable impurities. WO 2016/031519 A1 describes that by adjusting the amount of B to reduce the amount of B contained in secondary eutectic carbide, the strength of secondary eutectic carbide can be improved, thereby preventing the secondary eutectic carbide from being melted even when exposed to as high temperatures as about 1100° C. after solidification, ensuring the outer layer to exhibit excellent surface-roughening resistance. However, this outer layer fails to exhibit sufficient wear resistance and sticking resistance.

To satisfy the recent requirements of improving the thickness precision and surface quality of hot-rolled steel strips, the applicant proposed by WO 2015/045984 A1 a hot-rolling, centrifugally cast composite roll comprising an outer layer having a chemical composition comprising by mass 1-3% of C, 0.4-3% of Si, 0.3-3% of Mn, 1-5% of Ni, 2-7% of Cr, 3-8% of Mo, 3-7% of V, and 0.01-0.12% of B, the balance being Fe and inevitable impurities; meeting the relation expressed by the formula (1): Cr/(Mo+ 0.5W)<−⅔[C−0.2(V+1.19Nb)]+11/6, wherein when W and Nb, optional components, are not contained, W=0 and Nb=0; and containing by area 1-15% of MC carbide, 0.5-20% of carboboride, and 0.5-20% of Mo carbide. The outer layer of this composite roll exhibits excellent sticking resistance due to carboboride in the structure, and sufficient wear resistance. However, when the outer layer is integrally fused to an inner layer of ductile cast iron, B is diffused from the outer layer into the inner layer, so that ferrite is likely formed around graphite in the inner layer. An increased area ratio of ferrite in the inner layer reduces the wear resistance of the inner layer. Because the inner layer does not come into direct contact with a thin strip being rolled but is supported by bearings, the wearing of the inner layer likely generates vibration during rolling, thereby adversely affecting the quality of the steel strip.

Accordingly, to secure the wear resistance of the inner layer, it is desired to provide an outer layer of a rolling roll capable of obtaining a hot-rolled steel strip having high thickness precision and surface quality even when the B content is less than 0.01%.

OBJECTS OF THE INVENTION

Accordingly, an object of the present invention is to provide an outer layer of a rolling roll having excellent wear resistance, sticking resistance and surface-roughening resistance, particularly an outer layer of a rolling roll having a B content of less than 0.01% to secure the wear resistance of an inner layer.

Another object of the present invention is to provide a composite roll for rolling having such an outer layer.

DISCLOSURE OF THE INVENTION

As a result of intensive research in view of the above object, the inventors have found that in an outer layer of high-speed steel for a rolling roll, in which the B content is limited to less than 0.01%, the crystallization of a phase exhibiting the same function (sticking resistance) as that of graphite makes it possible to obtain excellent wear resistance, sticking resistance and surface-roughening resistance. The present invention has been completed based on such finding.

Thus, the outer layer of a rolling roll of the present invention has a chemical composition comprising by mass 1.3-2.8% of C, 0.3-1.8% of Si, 0.3-2.5% of Mn, 0-6.5% of Ni, 1-10% of Cr, 0.9-6% of Mo, 0-8% of W, 0.5-6% of V, 0-3% of Nb, and 0% or more and less than 0.01% of B, the balance being Fe and inevitable impurities, and meeting the following formulae (1) and (2):

$$1000 \leq 1177 - 52C + 14Si - 11Mn + 6.8Cr + 1W + 0.65Mo + 12V + 15Nb \leq 1115, \text{ and} \quad (1)$$

$$5 \leq Cr + Mo + 0.5W + V + 1.2Nb \leq 15, \quad (2)$$

wherein C, Si, Mn, Cr, W, Mo, V and Nb represent % by mass of these elements; and a structure containing eutectic carbide without graphite.

In the outer layer of the rolling roll of the present invention, the lowest solidification heat generation start temperature among those measured by differential thermal analysis is preferably 1100° C. or lower.

The outer layer of the rolling roll of the present invention preferably further comprises at least one selected from the group consisting of 5% or less of Co, 0.5% or less of Zr, 0.5% or less of Ti, and 0.5% or less of Al by mass.

In the rolling composite roll of the present invention, the outer layer is integrally fused to the inner layer. The inner layer is preferably made of ductile cast iron.

Effect of the Invention

The outer layer of the rolling roll of the present invention has high wear resistance and improved sticking resistance due to eutectic carbide, suffering less surface damage by a rolling load, thereby exhibiting excellent surface-roughening resistance. Accordingly, it can keep a smooth roll surface after rolling, contributing to improvement in the quality of rolled products. Also, because the outer layer of the rolling roll of the present invention contains only less than 0.01% of B, it can avoid the deterioration of the wear resistance of the inner layer. The rolling composite roll obtained by integrally fusing the outer layer having such features to an inner layer can satisfy recent requirements of improved thickness precision and surface quality of hot-rolled steel strips.

DESCRIPTION OF THE PREFERRED EMBODIMENTS

Figure 1:
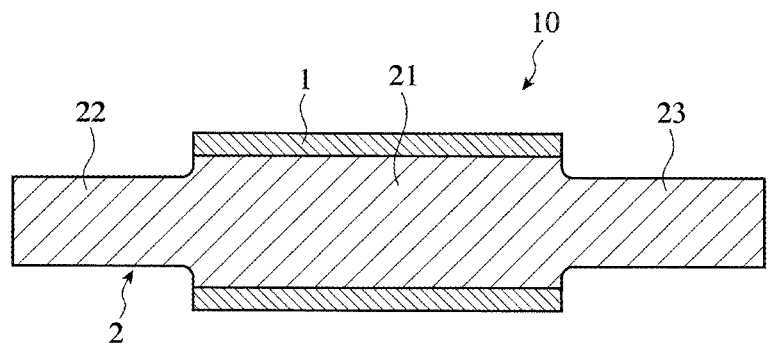
FIG. 1 is a schematic cross-sectional view showing a composite roll for rolling.

The embodiments of the present invention will be explained in detail below without intention of restriction, and various modifications may be made within the scope of the present invention. What is described simply as "%" means "% by mass," unless otherwise mentioned.

[1] Outer Layer of Rolling Roll (A) Composition

The outer layer of the rolling roll of the present invention is made of an Fe-based alloy comprising by mass 1.3-2.8% of C, 0.3-1.8% of Si, 0.3-2.5% of Mn, 0-6.5% of Ni, 1-10% of Cr, 0.9-6% of Mo, 0-8% of W, 0.5-6% of V, 0-3% of Nb, and 0% or more and less than 0.01% of B, the balance being substantially Fe and inevitable impurities.

(1) Main Elements (a) C: 1.3-2.8% by Mass

C is combined with V, Nb, Cr, Mo and W to form hard carbides, improving the wear resistance of the outer layer.

When C is less than 1.3% by mass, too small amounts of hard carbides are crystallized, failing to provide the outer layer with sufficient wear resistance. On the other hand, when C exceeds 2.8% by mass, excessive carbides are crystallized, providing the outer layer with lower toughness and lower cracking resistance, so that deep cracks are formed by rolling, resulting in increased roll loss. The lower limit of the C content is preferably 1.5% by mass, more preferably 1.8% by mass. The upper limit of the C content is preferably 2.6% by mass.

(b) Si: 0.3-1.8% by Mass

Si deoxidizes the melt to reduce oxide defects, is dissolved in the matrix to improve sticking resistance, and improves the fluidity of the melt to prevent casting defects. Less than 0.3% by mass of Si has an insufficient effect of deoxidizing the melt, and provides the melt with insufficient fluidity, resulting in a higher percentage of defects. On the other hand, when Si exceeds 1.8% by mass, the alloy matrix becomes brittle, providing the outer layer with low toughness. The lower limit of the Si content is preferably 0.5% by mass. The upper limit of the Si content is preferably 1.5% by mass, more preferably 1.2% by mass, most preferably 1.0% by mass.

(c) Mn: 0.3-2.5% by Mass

Mn has a function to deoxidize the melt, and fix S, an impurity, as MnS. Because MnS having a lubricating function is effective to prevent the sticking of a strip being rolled, it is preferable to contain a desired amount of MnS. Less than 0.3% by mass of Mn does not have sufficient effects. On the other hand, even though Mn exceeds 2.5% by mass, further effects cannot be obtained. The lower limit of the Mn content is preferably 0.5% by mass. The upper limit of the Mn content is preferably 2.0% by mass, more preferably 1.5% by mass.

(d) Ni: 0-6.5% by Mass

Because Ni has a function of improving the hardenability of the matrix, Ni added to a large composite roll can prevent the generation of pearlite during cooling, improving the hardness of the outer layer. However, because too much Ni added excessively stabilizes austenite, making it difficult to improve hardness, the Ni content is 6.5% or less. To improve hardenability, the Ni content is preferably 0.1% or more by mass, more preferably 0.3% or more by mass, further preferably 0.5% or more by mass, further preferably 0.6% or more by mass, further preferably 0.8% or more by mass, most preferably 1.0% or more by mass. To improve hardness, the Ni content is preferably 5.5% or less by mass, more preferably 4.5% or less by mass.

(e) Cr: 1-10% by Mass

Cr is an effective element for providing a bainite or martensite matrix to have high hardness, and forming carbide to secure wear resistance when added in large amount. When Cr is less than 1% by mass, its effects are insufficient. On the other hand, more than 10% by mass of Cr decreases the toughness of the matrix. The lower limit of the Cr content is preferably 1.5% by mass, more preferably 2% by mass. The upper limit of the Cr content is preferably 9% by mass, more preferably 8.5% by mass.

(f) Mo: 0.9-6% by Mass

Mo is combined with C to form hard carbide ($M_6C$, $M_2C$), increasing the hardness of the outer layer, and improving the hardenability of the matrix. Mo also forms tough and hard MC carbide together with V and Nb, improving wear resistance. When Mo is less than 0.9% by mass, these effects are insufficient. On the other hand, more than 6% by mass of Mo decreases the toughness of the outer layer. The lower limit of the Mo content is preferably 1.5% by mass. The upper limit of the Mo content is preferably 5% by mass.

(g) W: 0-8% by Mass

W is combined with C to form hard carbides such as $M_6C$, etc., contributing to improvement in the wear resistance of the outer layer. It is also dissolved in MC carbide to increase its specific gravity, reducing segregation. However, more than 8% by mass of W increases $M_6C$ carbide, making the structure non-uniform, and thus causing surface roughening. Accordingly, W, if added, is 8% or less by mass. Also, W is preferably 0.5% or more by mass, because less than 0.5% by mass of W does not provide sufficient effects. The upper limit of the W content is preferably 6% by mass, more preferably 4% by mass, further preferably 2% by mass.

(h) V: 0.5-6% by Mass

V is an element combined with C to form hard MC carbide. MC carbide having Vickers hardness Hv of 2500-3000 is the hardest carbide. When V is less than 0.5% by mass, a sufficient amount of MC carbide is not precipitated. On the other hand, when V is more than 6% by mass, MC carbide having a low specific gravity is concentrated in the outer layer on the inner surface side by a centrifugal force during centrifugal casting, likely providing a large radial segregation of MC carbide, making larger MC carbide to provide a coarser alloy structure, and causing surface roughening during rolling. The lower limit of the V content is preferably 0.8% by mass, more preferably 1.2% by mass. The upper limit of the V content is preferably 5% by mass, more preferably 4% by mass, further preferably 3% by mass.

(i) Nb: 0-3% by Mass

Like V, Nb is combined with C to form hard MC carbide. Nb is dissolved in MC carbide when added together with V and Mo, to strengthen the MC carbide, thereby improving the wear resistance of the outer layer. Because the density difference is smaller between NbC (MC carbide) and the melt than between VC (MC carbide) and the melt, the segregation of MC carbide is reduced. The lower limit of the Nb content is preferably 0.2% by mass. The upper limit of the Nb content is preferably 2% by mass, more preferably 1.5% by mass, further preferably 1% by mass.

(j) B: 0% or More and Less than 0.01% by Mass

When B is 0.01% or more by mass, more than a permitted amount of B is likely diffused into the inner layer made of ductile cast iron during integral fusing. With B excessively diffused into the inner layer, ferrite is likely formed around graphite in the inner layer, resulting in an increased area ratio of ferrite in the inner layer, so that the inner layer has lower wear resistance. Because the inner layer is not in direct contact with a hot-rolled strip but supported by bearings, too much wearing of the inner layer likely causes vibration during rolling, adversely affecting the quality of a steel strip. Accordingly, B is less than 0.01% by mass. The upper limit of B is preferably 0.008% by mass, more preferably 0.007% by mass. To reduce the B content, it is preferable to use scraps, etc. containing as little B as possible, as a raw material.

(2) Additional Elements (a) Co: 5% or Less by Mass

Co is an effective element for strengthening the matrix, but more than 5% by mass of Co lowers the toughness of the outer layer. To obtain sufficient effects of strengthening the matrix, the lower limit of the Co content is preferably 0.5% by mass, more preferably 1% by mass. The upper limit of the Co content is more preferably 3% by mass.

(b) Zr: 0.5% or Less by Mass

Zr is combined with C to form MC carbide, improving wear resistance. Zr also forms oxide in the melt, and this oxide functions as crystal nuclei for making the solidified structure finer. Further, Zr increases the specific gravity of MC carbide, effectively preventing segregation. However, when Zr exceeds 0.5% by mass, inclusions are undesirably formed. The upper limit of the Zr content is more preferably 0.3% by mass. To obtain sufficient effects, the lower limit of the Zr content is more preferably 0.01% by mass.

(c) Ti: 0.5% or Less by Mass

Ti is combined with N in the melt to form nitride, which is dispersed in the melt to act as nuclei for making MC carbide finer and more uniform. However, when Ti exceeds 0.5% by mass, the viscosity of the melt increases, resulting in more casting defects. To obtain sufficient effects, the lower limit of the Ti content is preferably 0.005% by mass, more preferably 0.01% by mass. The upper limit of the Ti content is more preferably 0.3% by mass, further preferably 0.2% by mass.

(d) Al: 0.5% or Less by Mass

Al is combined with O in the melt to form oxide. With the amount of O in the melt reduced, the oxidation of carbide-forming elements such as V, Cr, etc., which improve wear resistance, can be prevented. However, more than 0.5% by mass of Al makes the outer layer brittle, resulting in lower mechanical properties. To obtain sufficient effects, the lower limit of the Al content is preferably 0.001% by mass, more preferably 0.01% by mass. The upper limit of the Al content is more preferably 0.3% by mass, further preferably 0.2% by mass.

(3) Inevitable Impurities

The balance of the composition of the outer layer are substantially Fe and inevitable impurities. The inevitable impurities are P, S, N, Cu, rare earth elements (REMs), etc., which may be P<0.1% by mass, S<0.1% by mass, N<0.1% by mass, Cu<0.1% by mass, and REMs<0.1% by mass, respectively.

(4) Formulae Expressing Relations

The outer layer of the rolling roll of the present invention meets the relations expressed by the following formulae (1) and (2):

$$1000 \leq 1177-52C+14Si-11Mn+6.8Cr+1W+0.65Mo+12V+15Nb \leq 1115, \text{ and} \quad (1)$$

$$5 \leq Cr+Mo+0.5W+V+1.2Nb \leq 15, \quad (2)$$

wherein C, Si, Mn, Cr, W, Mo, V and Nb represent % by mass of these elements.

(a) Formula (1)

The parameter $P1=1177-52C+14Si-11Mn+6.8Cr+1W+0.65Mo+12V+15Nb$ in the formula (1) is an index relating to the melting point of eutectic carbide having the lowest melting point among those existing in the outer layer. With P1 of 1115 or less, the outer layer has improved sticking resistance. This reason appears to be the improvement of lubrication of the outer layer of the roll to a strip being rolled, due to the melting of low-melting-point eutectic carbide by heat of friction between the strip being rolled and the outer layer surface in the rolling of an overlapped strip. The upper limit of P1 is preferably 1110, more preferably 1105, further preferably 1100. On the other hand, when P1 is less than 1000, the melting point of eutectic carbide is too low, so that shrinkage cavities are likely formed in a boundary between the outer layer and the inner layer when they are integrally fused to form a composite roll for rolling. Cracks propagate from shrinkage cavities, if any. The lower limit of P1 is preferably 1010, more preferably 1020, further preferably 1030, most preferably 1040.

(b) Formula (2)

The parameter $P2=Cr+Mo+0.5W+V+1.2Nb$ in the formula (2) is an index expressing a sum of elements forming harder carbides than cementite, relatively soft carbide. Cr, Mo, W, V and Nb may be called "carbide-forming elements." Carbides of these elements not only improve the wear resistance of the matrix, but also form low-melting-point eutectic carbide. P2 of less than 5 provides a low percentage of harder carbides than cementite, resulting in lower wear resistance of the outer layer. On the other hand, P2 of more than 15 elevates the melting point of eutectic carbide having the lowest melting point, failing to improve lubrication between a strip being rolled and the outer layer of the roll. The lower limit of P2 is preferably 7, more preferably 8, further preferably 9. The upper limit of P2 is preferably 14, more preferably 13, further preferably 12.

(B) Structure

The outer layer of the rolling roll of the present invention is characterized by having a structure comprising eutectic carbide without graphite. In addition, the structure of the outer layer comprises a matrix, MC carbides, etc. To secure wear resistance, the matrix of the structure is preferably composed of martensite and/or bainite.

Figure 3:
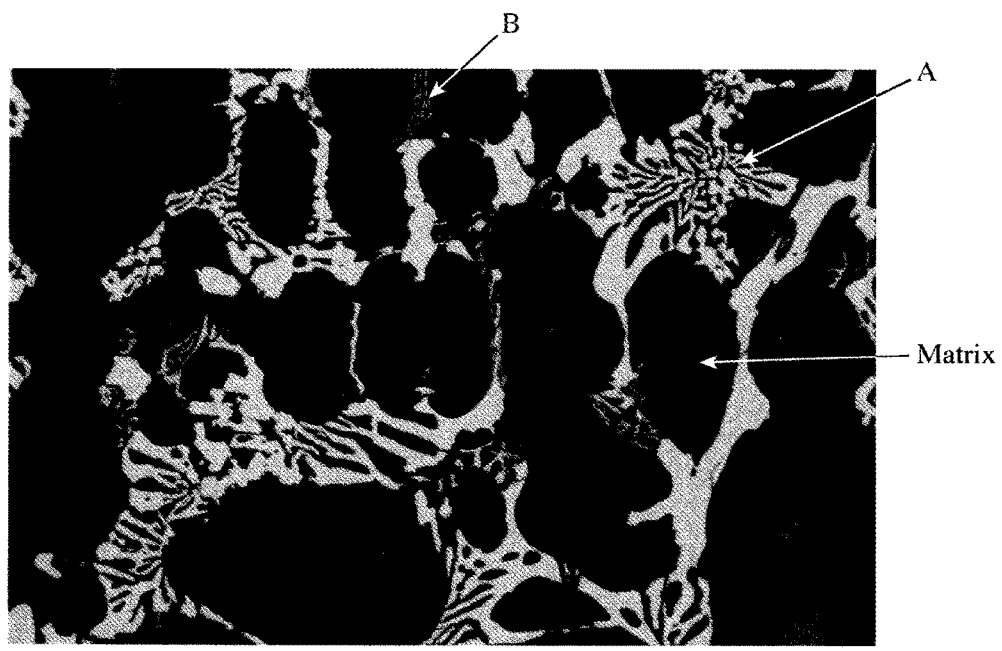
FIG. 3 is an optical photomicrograph showing the test piece of Example 1 after etched with ammonium persulfate.

The eutectic carbide is a eutectic of austenite constituting an iron matrix at room temperature and carbides ($M_2C$, $M_6C$, $M_7C_3$, $M_{23}C_6$, etc.), improving both wear resistance and sticking resistance of the outer layer. As is clear from FIG. 3 showing an optical photomicrograph (magnification: 400 times) of a test piece cut out of the outer layer of Example 1, which is mirror-polished and etched with ammonium persulfate, there are two types of eutectic carbide, eutectic carbide A with wide carbide segment space, and eutectic carbide B with narrow carbide segment space.

The structure of the outer layer does not contain graphite. If the outer layer contains graphite, graphite tends to peel off when rolling a steel strip, likely resulting in a rough roll surface having poor wear resistance and surface-roughening resistance. Whether the structure of the outer layer contains graphite or not is judged by observing an optical photomicrograph (magnification: 100 times) of a test piece cut out of the outer layer, which is mirror-polished but not etched. Because black particles in the optical photomicrograph are cavities or graphite particles, the absence of black particles having major axes of 20 µm or more in the above optical photomicrograph means that there are no graphite particles having major axes of 20 µm or more. Accordingly, when there are no black particles having major axes of 20 µm or more in an optical photomicrograph (magnification: 100 times) taken without etching, it is judged herein that the structure of the outer layer does not contain graphite. Because the outer layer of the rolling roll of the present invention has a high-alloy composition shown by the formula (2), graphite is hardly formed in the structure. In addition, inoculation with Si, etc. for precipitating graphite is not conducted.

(C) Solidification Heat Generation Start Temperature

Figure 4:
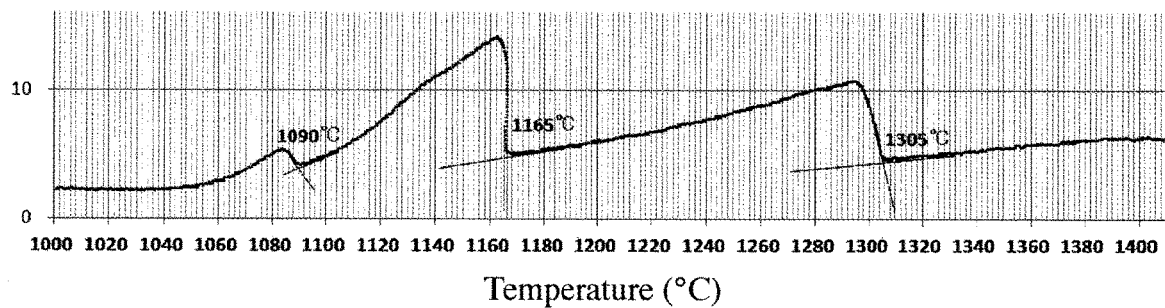
FIG. 4 is a graph showing the differential thermal analysis results of the outer layer for a rolling roll of Example 1.

In the outer layer of the rolling roll of the present invention, the lowest solidification heat generation start temperature among those determined by differential thermal analysis is preferably 1100° C. or lower. The solidification heat generation by differential thermal analysis means the generation of heat when a liquid phase is turned to a solid phase (the melt is solidified). As is clear from FIG. 4 showing the data measured in Example 1, there are mainly three types of solidification heat generations in the composition range of the outer layer of the rolling roll of the present invention. In FIG. 4, heat generation at 1305° C. (high-temperature side) is caused by the solidification of a matrix, heat generation at 1165° C. (center) is caused by the solidification of the eutectic carbide A with wide carbide segment space shown in FIG. 3, and heat generation at 1090° C. (low-temperature side) is caused by the solidification of the eutectic carbide B with narrow carbide segment space shown in FIG. 3.

The solidification heat generation of the outer layer is measured as follows: A sample of 5 g is cut out of the outer layer, melted by heating to 1500° C., and then cooled at a cooling speed of 10° C./minute to measure differential heat by a differential thermal analyzer. As shown in FIG. 4, the solidification heat generation temperature is defined as an inflection point on the right side (high-temperature side) of a heat generation peak. Specifically, it is a temperature at an intersection of tangent lines of both sides of the inflection point on the high-temperature side of the solidification heat generation peak.

In the outer layer of the rolling roll of the present invention, the lowest one among pluralities of solidification heat generation start temperatures is preferably 1100° C. or lower. This is because when the solidification temperature of eutectic carbide having the lowest melting point is 1100° C. or lower, the outer layer has improved sticking resistance. For example, if an overlapped strip is stuck to an outer layer surface of the roll, the outer layer of the roll is likely cracked by a thermal, mechanical load. If a cracked roll continued to be used, cracks would propagate, so that the roll may be subject to breakage or damage called "spalling." If sticking occurred on the roll surface, rolling stress would be concentrated in the stuck portion, accelerating the propagation of cracking in the stuck portion. The melting of eutectic carbide prevents sticking to the roll outer surface during overlapped rolling, thereby avoiding the concentration of stress in the stuck portion, and thus preventing the propagation of cracking. Accordingly, "dressing" for grinding an outer layer surface of the roll to remove cracks can be reduced, and operation failures causing large damage to rolling, such as spalling and roll breakage, can be prevented.

The lowest solidification heat generation start temperature is preferably 1000° C. or higher. This is because if it is lower than 1000° C., the melting point of eutectic carbide is too low, so that shrinkage cavities are likely formed in a boundary of an outer layer and an inner layer when the outer layer is integrally fused to the inner layer to form a composite roll for rolling, making the roll unusable for rolling. The upper limit of the lowest solidification heat generation start temperature is more preferably 1095° C., further preferably 1090° C. The lower limit of the lowest solidification heat generation start temperature is preferably 1010° C., more preferably 1020° C., further preferably 1030° C., most preferably 1040° C.

Though WO 2016/031519 A1 describes that because of excellent surface-roughening resistance, secondary eutectic carbide is not melted even if it is exposed to high temperatures of about 1100° C., the roll surface temperature is about 800° C. or lower in usual rolling, the low-melting-point eutectic carbide is not melted, causing no problem of surface-roughening. The roll surface is exposed to as high temperatures as 1000° C. or higher, only in overlapped rolling in which excessively high pressure and heat are generated on the roll surface, or in abnormal rolling in which a high-temperature strip is in contact with the rolls without being cooled for a long period of time because of sudden mill stoppage with a rolled strip stalled bitten between the rolls. The roll surface temperature never reaches as high a temperature as 1000° C. or higher during normal rolling. On the other hand, the present invention is based on a technical idea of preventing cracking in overlapped rolling, etc. by the melting of low-melting-point eutectic carbide, while avoiding surface-roughening during usual rolling, just opposite to the idea of WO 2016/031519 A1.

[2] Composite Roll for Rolling

The outer layer for the rolling roll of the present invention can be integrally fused to an inner layer for use as a composite roll for rolling. FIG. 1 shows a hot-rolling composite roll 10 comprising an outer layer 1 formed by a centrifugal casting method, and an inner layer 2 integrally fused to the outer layer 1. The inner layer 2 is constituted by a core portion 21 fused to the outer layer 1, and shafts 22, 23 integrally extending from both ends of the core portion 21. Because the outer layer 1 contains carbide-forming elements in large amounts to secure wear resistance, the inner layer 2 is preferably made of an Fe-based alloy having excellent toughness. From the aspect of toughness and castability, the inner layer 2 is preferably made of cast iron having good castability, particularly ductile cast iron.

The ductile cast iron preferably has a composition comprising by mass 2.3-4.0% of C, 1.5-3.5% of Si, 0.2-2.0% of Mn, 0.1% or less of P, 0.1% or less of S, 0.3-5.0% of Ni, 0.01-1.0% of Cr, 0.01-1.0% of Mo, and 0.01-0.08% of Mg, the balance being substantially Fe and inevitable impurities. In addition to the above elements, the ductile cast iron may contain 1% or less of V, 0.7% or less of Nb, and 0.7% or less of W. The ductile cast iron comprises an iron matrix based on ferrite and pearlite, as well as graphite and a trace amount of cementite. For the purpose of suppressing the mixing of components, etc., an intermediate layer may be formed between the outer layer and the inner layer.

[3] Production Method of Rolling Composite Roll

Figure 5A:
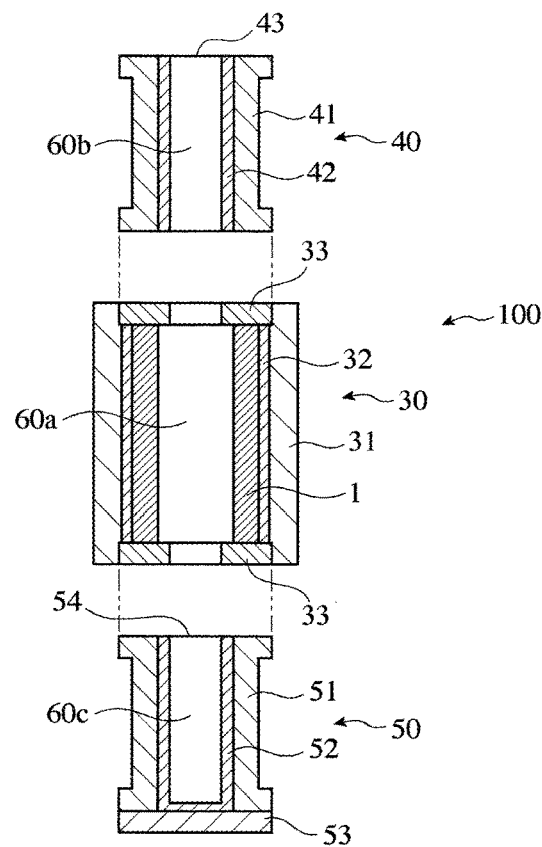
FIG. 5(a) is an exploded cross-sectional view showing an example of casting molds used for producing the rolling composite roll of the present invention.
Figure 5B:
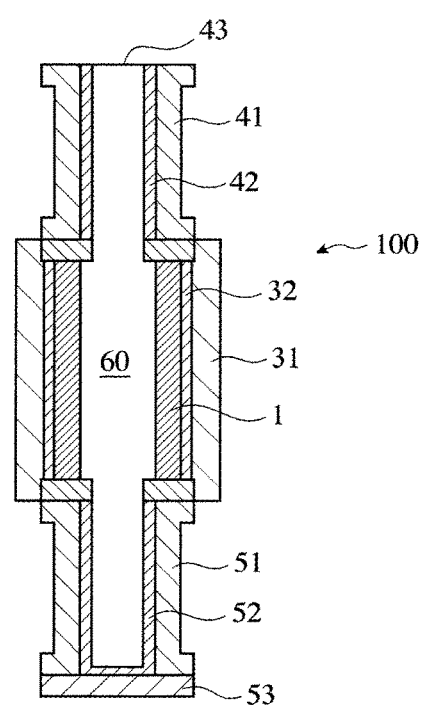
FIG. 5(b) is a cross-sectional view showing an example of casting molds used for producing the rolling composite roll of the present invention.

FIGS. 5(a) and 5(b) show an example of static casting molds used for casting an inner layer 2 after centrifugally casting an outer layer 1 in a cylindrical, centrifugal-casting mold 30. This static casting mold 100 comprises a cylindrical casting mold 30, and an upper mold 40 and a lower mold 50 attached to upper and lower ends of the cylindrical casting mold 30. An inner surface of the outer layer 1 in the cylindrical casting mold 30 assembled in the static casting mold 100 constitutes a cavity 60a for forming a core portion 21, via a coating 32. Formed inside an upper mold body 41 of the upper mold 40 is a sand mold 42 having a cavity 60b inside. Formed inside a lower mold body 51 of the lower mold 50 is a sand mold 52 having a cavity 60c inside. The lower mold 50 is provided with a bottom plate 53 for holding a melt for the inner layer. A centrifugal casting method using the cylindrical casting mold 30 may be a horizontal, inclined or vertical type.

As shown in FIG. 5(b), with the upper mold 40 and the lower mold 50 assembled to upper and lower ends of the cylindrical casting mold 30, the cavity 60a in the outer layer 1 communicates with the cavity 60b of the upper mold 40 and the cavity 60c of the lower mold 50, thereby forming a cavity 60 for integrally forming the entire inner layer 1. The cylindrical casting mold 30 with the centrifugally cast outer layer 1 is vertically placed on the lower mold 50 for forming the shaft 22, and the upper mold 40 for forming the shaft 23 is placed on the cylindrical mold 30, thereby constituting the static casting mold 100 for forming the inner layer 2.

In the static casting mold 100, as a ductile cast iron melt for the inner layer 2 is poured into the cavity 60 through an upper opening 43 of the upper mold 40 after solidifying the outer layer 1 formed by a centrifugal casting method, a surface of the melt in the cavity 60 is gradually elevated from the lower mold 50 to the upper mold 40, integrally forming the inner layer 2 constituted by the shaft 22, the core portion 21 and the shaft 23.

The rolling composite roll produced by the above method is preferably tempered at 400-580° C. to decompose retained austenite and relieve strain. When the matrix is austenized by hardening after heating, for example, at 850-1060° C. and P1 (or Ts)−50° C. or lower, to turn the matrix structure to martensite and/or bainite, tempering is conducted preferably at 400-580° C.

Though the rolling composite roll of the present invention produced by a centrifugal casting method has been explained, it can be produced by a so-called continuous cladding-forming method for continuously forming an outer layer from a melt poured around a steel core shaft by an high-frequency induction coil.

The present invention will be explained in detail by Examples below without intention of restriction.

Examples 1-5, and Comparative Examples 1-4

(1) Casting

Using an experimental casting mold (inner diameter: 90 mm, and depth: 95 mm), each melt having the composition shown in Table 1 below and the values of P1 and P2 shown in Table 2 was cast into a sample.

(2) Evaluation of Presence or Absence of Graphite and Eutectic Carbide

Figure 2:
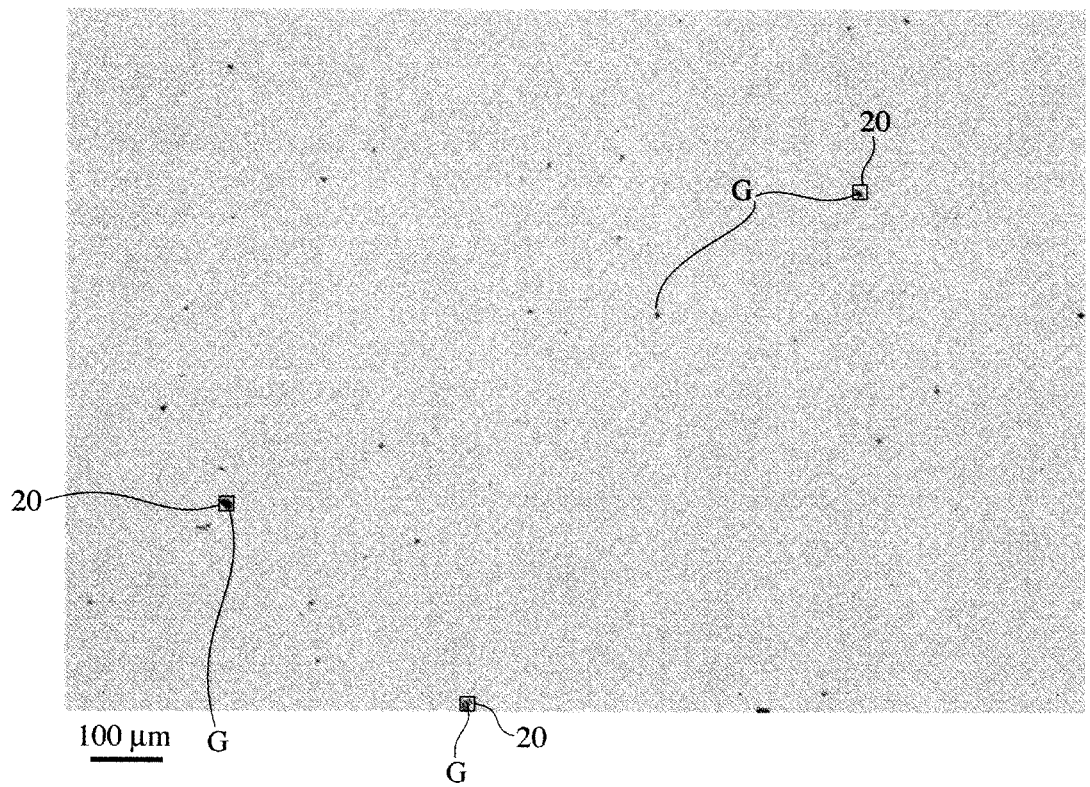
FIG. 2 is an optical photomicrograph (magnification: 100 times) showing an unetched structure of the test piece of Example 1.

After a test piece was cut out of each sample tempered at 480° C., and mirror-polished, its structure without etching was photographed by an optical microscope (magnification: 100 times). FIG. 2 shows an optical photomicrograph (magnification: 100 times) of the sample of Example 1. In FIG. 2, G shows a black particle, and 20 shows a square of 20 μm×20 μm surrounding a black particle G As is clear from FIG. 2, the test piece of Example 1 did not contain black particles G having major axes of 20 μm or more. Because the black particles are fine cavities or graphite particles, graphite particles would be as fine as less than 20 μm in length, if any. Accordingly, when there were no black particles having major axes of 20 μm or more in the optical photomicrographs of Examples and Comparative Examples, it was judged that the structure of the outer layer did not contain graphite. Further, each test piece, whose mirror-polished surface was etched with ammonium persulfate, was photographed by an optical microscope (magnification: 400 times) to observe the presence or absence of eutectic carbide. FIG. 3 shows the optical photomicrograph (magnification: 400 times) of Example 1. Table 2 shows the presence or absence of graphite and eutectic carbide in the structure of each test piece.

(3) Measurement of Solidification Heat Generation Start Temperature

A test piece of 5 g cut out of each sample was subjected to differential thermal analysis, to determine the lowest solidification heat generation start temperature Ts among those measured. The lowest solidification heat generation start temperature Ts of each sample is shown in Table 2. Also, the differential thermal analysis result of the test piece of Example 1 is shown in FIG. 4.

(4) Wear Test

Figure 6:
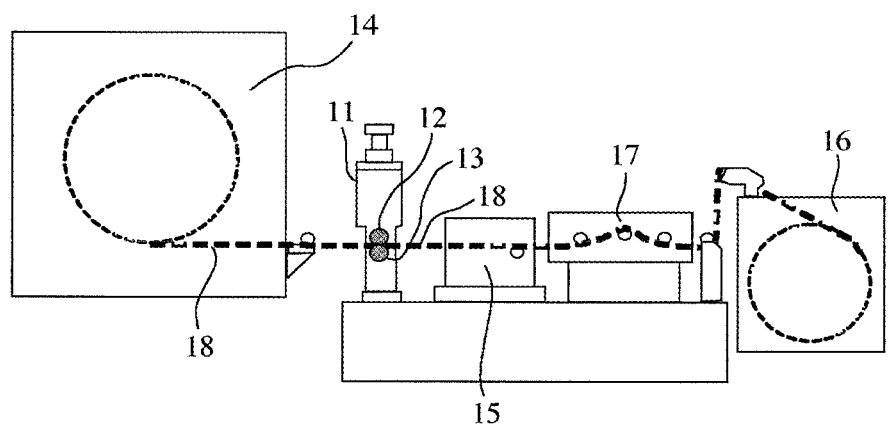
FIG. 6 is a schematic view showing a rolling wear test machine.

A test roll having a sleeve structure of 60 mm in outer diameter, 40 mm in inner diameter and 40 mm in width was produced from each melt. To evaluate wear resistance, a wear test was conducted on each test roll by a rolling wear test machine shown in FIG. 6. The rolling wear test machine comprises a rolling machine 11, test rolls 12, 13 assembled in the rolling machine 11, a furnace 14 for preheating a strip 18 to be rolled, a cooling water bath 15 for cooling the rolled strip 18, a winding reel 16 for providing a constant tension during rolling, and a controller 17 for adjusting the tension. The rolling wear conditions are shown below. After rolling, the depth of wear generated on each test roll surface was measured by a stylus-type surface roughness meter. The measurement results of the wear depth are shown in Table 2.

Material of strip to be rolled: SUS304,
Width of strip to be rolled: 20 mm,
Thickness of strip to be rolled: 1 mm,
Rolling reduction: 25%,
Rolling speed: 150 m/minute,
Temperature of strip being rolled: 900° C.,
Rolling distance: 300 m/strip,
Cooling of roll: Water-cooling, and
The number of rolls: 4-high type.

(5) Evaluation of Impact Resistance (Sticking Resistance)

Figure 7:
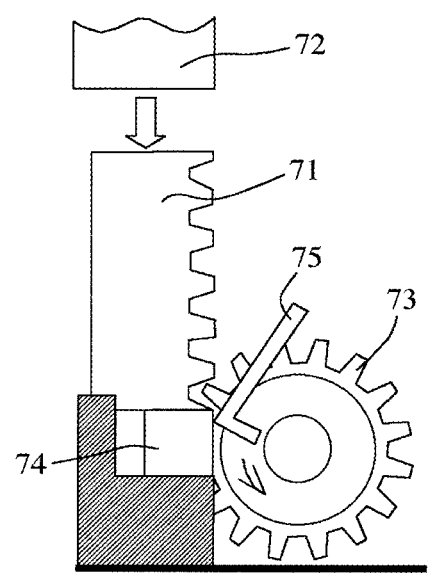
FIG. 7 is a schematic view showing a test machine of thermal shock by friction.

To evaluate impact resistance, a sticking test was conducted on each test roll by a test machine of thermal shock by friction shown in FIG. 7. The test machine of thermal shock by friction comprises a rack 71 onto which a weight 72 is dropped to rotate a pinion 73, so that a biting material 75 is brought into strong contact with a test piece 74. This test provided the test piece 74 with dents, to part or all of which the biting material 75 was stuck. On each sample, a sticking area was measured twice, averaged, and divided by a dent area to determine an area ratio of sticking (%). The degree of sticking was evaluated by the area ratio of sticking as described below. The results are shown in Table 2. The smaller the sticking, the better the impact resistance.

Good: The area ratio of sticking was less than 40%.
Fair: The area ratio of sticking was 40% or more and less than 60%.
Poor: The area ratio of sticking was 60% or more.

TABLE 1

| | Composition of Outer Layer[1] (% by mass) | | | | | | | | | |
|---|---|---|---|---|---|---|---|---|---|---|
| No. | C | Si | Mn | Ni | Cr | Mo | W | V | Nb | B |
| Com. Ex. 1 | 1.93 | 0.78 | 0.72 | 1.25 | 5.24 | 3.39 | 0.19 | 1.70 | 0.49 | 0.002 |
| Com. Ex. 2 | 2.25 | 0.72 | 0.98 | 1.36 | 8.94 | 3.31 | 0 | 1.09 | 0.20 | 0.007 |
| Example 1 | 2.70 | 0.67 | 0.99 | 1.33 | 6.74 | 3.22 | 0 | 1.05 | 0.20 | 0.004 |
| Example 2 | 2.54 | 0.57 | 1.02 | 1.23 | 5.02 | 3.19 | 0.19 | 1.43 | 0.24 | 0.002 |
| Example 3 | 2.25 | 0.42 | 1.96 | 4.14 | 1.03 | 3.46 | 0.52 | 2.81 | 0.62 | 0.004 |
| Example 4[2] | 2.74 | 0.41 | 2.43 | 1.07 | 1.02 | 2.84 | 0 | 1.41 | 0 | 0.005 |
| Com. Ex. 3 | 1.94 | 0.55 | 1.38 | 0.86 | 1.04 | 1.71 | 0.50 | 1.26 | 0.17 | 0.004 |

TABLE 1-continued

| | Composition of Outer Layer[1] (% by mass) | | | | | | | | | |
|---|---|---|---|---|---|---|---|---|---|---|
| No. | C | Si | Mn | Ni | Cr | Mo | W | V | Nb | B |
| Example 5 | 2.72 | 0.65 | 1.02 | 1.30 | 6.71 | 3.12 | 0 | 1.10 | 0.12 | 0.007 |
| Com. Ex. 4[3] | 1.63 | 0.79 | 0.61 | 1.92 | 4.53 | 4.34 | 0.44 | 4.27 | 0.52 | 0.052 |

Note:
[1]The balance are Fe and inevitable impurities.
[2]Containing 0.021% by mass of Ti.
[3]Containing 0.18% by mass of S, 0.02% by mass of Al, and 0.029% by mass of N.

TABLE 2

| No. | P1[1] | P2[2] | Eutectic Carbide | Graphite | Ts[3] (° C.) | Wear Depth (μm) | Sticking |
|---|---|---|---|---|---|---|---|
| Com. Ex. 1 | 1145 | 11.0 | Yes | No | 1111 | 15.6 | Poor |
| Com. Ex. 2 | 1138 | 13.6 | Yes | No | 1116 | 14.2 | Poor |
| Example 1 | 1099 | 11.3 | Yes | No | 1090 | 14.8 | Good |
| Example 2 | 1099 | 10.0 | Yes | No | 1088 | 16.7 | Good |
| Example 3 | 1097 | 8.3 | Yes | No | 1064 | 24.0 | Good |
| Example 4 | 1039 | 5.3 | Yes | No | 1045 | 38.8 | Good |
| Com. Ex. 3 | 1095 | 4.5 | Yes | No | —[4] | 51.3 | Good |
| Example 5 | 1096 | 11.1 | Yes | No | 1081 | 14.3 | Good |
| Com. Ex. 4 | 1190 | 14.0 | Yes | No | —[4] | 13.6 | Fair |

Note:
[1]P1 = 1177 − 52C + 14Si − 11Mn + 6.8Cr + 1W + 0.65Mo + 12V + 15Nb.
[2]P2 = Cr + Mo + 0.5W + V + 1.2Nb.
[3]Ts represents the lowest solidification heat generation start temperature.
[4]Not measured.

Example 6 and Comparative Example 5

With a cylindrical casting mold 30 (inner diameter: 800 mm, and length: 2500 mm) having the structure shown in FIG. 5(a) set in a horizontal centrifugal casting machine, melts having the same compositions as in Example 1 and Comparative Example 4 were centrifugally cast to form the outer layers 1 of Example 6 and Comparative Example 5. After the solidification of each outer layer 1, the cylindrical casting mold 30 having the outer layer 1 (thickness: 90 mm) formed on its inner surface was erected and placed on a hollow lower mold 50 (inner diameter: 600 mm, and length: 1500 mm) for forming a shaft 22, and a hollow upper mold 40 (inner diameter: 600 mm, and length: 2000 mm) for forming a shaft 23 was vertically placed on the cylindrical casting mold 30, thereby constituting a static casting mold 100 shown in FIG. 5(b).

A ductile cast iron melt having a chemical composition comprising by mass 3.0% of C, 2.6% of Si, 0.3% of Mn, 1.4% of Ni, 0.1% of Cr, 0.2% of Mo, 0.05% of Mg, 0.03% of P, and 0.03% of S, the balance being substantially Fe and inevitable impurities, was poured into a cavity 60 of the static casting mold 100 through its upper opening 43, to produce a composite roll comprising an inner layer 2 integrally fused to an inner surface of the outer layer 1, with an Si-containing graphitization inoculant added in its course. The composite roll was then tempered at 500° C.

A test piece cut out of each outer layer 1 of Example 6 and Comparative Example 5 was evaluated with respect to the presence or absence of graphite and eutectic carbide, and subjected to differential thermal analysis, in the same manner as in Example 1. As a result, it was found that the outer layer 1 of Example 6 contained eutectic carbide without graphite, and had the lowest solidification heat generation start temperature Ts on the same level as in Example 1. The outer layer 1 of Comparative Example 5 contained eutectic carbide without graphite, and had the lowest solidification heat generation start temperature Ts on the same level as in Comparative Example 4.

Test pieces were cut out of the shafts 22, 23 of each inner layer 2 of Example 6 and Comparative Example 5 to observe the structure. As a result, it was found that in the shafts 22, 23 of the inner layer 2 of Example 6 using the same outer layer 1 as in Example 1, the area ratio of ferrite in the structure was as low as about 15-25%. Accordingly, it was confirmed that the composite roll of Example 6 comprised an outer layer having excellent wear resistance and sticking resistance, and an inner layer having excellent wear resistance. On the other hand, in the shafts 22, 23 of the inner layer 2 of Comparative Example 5 using the same outer layer 1 as in Comparative Example 4, most graphite particles were surrounded by ferrite as wide as 50 μm to 80 μm in the structure, the area ratio of ferrite being as high as about 30-40%. This is presumably because 0.052% (0.01% or more) by mass of B contained in the outer layer was diffused into the inner layer 2.

DESCRIPTION OF REFERENCE NUMERALS

1: Outer layer
2: Inner layer
21: Core portion
22, 23: Shaft portion
10: Hot-rolling composite roll
11: Rolling machine
12, 13: Test roll
14: Heating furnace
15: Cooling water bath
16: Winding reel
17: Controller
18: Strip being rolled
20: Square of 20 μm×20 μm surrounding a black particle in optical photomicrograph
30: Cylindrical centrifugal casting mold
31: Cylindrical casting mold body
32: Coating
42, 52: Sand mold
40: Upper mold
41: Upper mold body
43: Upper opening
50: Lower mold
51: Lower mold body
53: Bottom plate 60, 60a, 60b, 60c: Cavity
100: Static casting mold
G: Black particle

What is claimed is:

1. An outer layer of a rolling roll having
a chemical composition comprising by mass 1.3-2.8% of C, 0.3-1.8% of Si, 0.3-2.5% of Mn, 0-6.5% of Ni, 1-10% of Cr, 0.9-6% of Mo, 0-8% of W, 0.5-6% of V, 0-3% of Nb, and 0% or more and less than 0.01% of B, the balance being Fe and inevitable impurities, and meeting the following formulae (1) and (2):

(1): $1000 \leq 1177-52C+14Si-11Mn+6.8Cr+1W+0.65Mo+12V+15Nb \leq 1115$, and (2): $5 \leq Cr+Mo+0.5W+V+1.2Nb \leq 15$, wherein C, Si, Mn, Cr, W, Mo, V and Nb represent % by mass of these elements, and a structure containing eutectic carbide without graphite.

2. The outer layer of a rolling roll according to claim 1, wherein the lowest solidification heat generation start temperature among those measured by differential thermal analysis is 1100° C. or lower.

3. The outer layer of a rolling roll according to claim 1, wherein said outer layer further comprises at least one selected from the group consisting of 5% or less by mass of Co, 0.5% or less by mass of Zr, 0.5% or less by mass of Ti, and 0.5% or less by mass of Al.

4. A composite roll for rolling comprising the outer layer according to claim 1 and an inner layer, wherein said outer layer is integrally fused to said inner layer.

5. The composite roll for rolling according to claim 4, wherein said inner layer is made of ductile cast iron.

6. The composite roll for rolling according to claim 4, wherein said outer layer is formed by a centrifugal casting method.

* * * * *